(12) United States Patent
Ikeda et al.

(10) Patent No.: US 8,335,580 B2
(45) Date of Patent: Dec. 18, 2012

(54) AUDIO REPRODUCING APPARATUS AND AUDIO REPRODUCING METHOD, ALLOWING EFFICIENT DATA SELECTION

(75) Inventors: Nozomu Ikeda, Tokyo (JP); Kosei Yamashita, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1032 days.

(21) Appl. No.: 12/033,972

(22) Filed: Feb. 20, 2008

(65) Prior Publication Data

US 2008/0228299 A1  Sep. 18, 2008

(30) Foreign Application Priority Data

Mar. 15, 2007 (JP) .................. 2007-066523

(51) Int. Cl.
*G06F 17/00* (2006.01)
*G06F 3/16* (2006.01)
*A63F 13/00* (2006.01)

(52) U.S. Cl. .............. 700/94; 715/727; 463/35
(58) Field of Classification Search .......... 700/94; 715/727; 463/33, 35
See application file for complete search history.

(56) References Cited

U.S. PATENT DOCUMENTS

| | | | |
|---|---|---|---|
| 6,760,050 B1 * | 7/2004 | Nakagawa | 715/727 |
| 7,268,288 B2 * | 9/2007 | Yamane et al. | 84/615 |
| 7,546,242 B2 * | 6/2009 | Chevallier et al. | 704/270 |
| 2002/0150254 A1 * | 10/2002 | Wilcock et al. | 381/1 |
| 2004/0030491 A1 * | 2/2004 | Hull | 701/207 |
| 2005/0281411 A1 * | 12/2005 | Vesely et al. | 463/35 |
| 2006/0251263 A1 * | 11/2006 | Vronay | 381/17 |
| 2007/0021961 A1 * | 1/2007 | Oh | 700/94 |

FOREIGN PATENT DOCUMENTS

| | | |
|---|---|---|
| JP | 9090963 A | 4/1997 |
| JP | 10124292 A | 5/1998 |
| JP | 10256858 A | 9/1998 |
| JP | 2000181593 A | 6/2000 |
| JP | 2000194460 A | 7/2000 |
| JP | 2000236600 A | 8/2000 |
| JP | 2002149163 A | 5/2002 |

OTHER PUBLICATIONS

Japanese Office Action for corresponding Japanese Patent application No. 2007-066523, Mar. 3, 2009.
Office Action for corresponding Japanese Patent Application No. JP2007-066523, Dec. 16, 2008.

* cited by examiner

*Primary Examiner* — Jesse Elbin
(74) *Attorney, Agent, or Firm* — Matthew B. Dernier, Esq.; Gibson & Dernier LLP

(57) ABSTRACT

In a music selection mode, a reproduction object deciding unit in an audio reproducing apparatus selects a plurality of pieces of candidate music from music data stored in a storage unit and has a reproducing unit reproduce them simultaneously. An assigned position deciding unit controls an audio processing unit in such a manner as to assign the sound images of the pieces of candidate music respectively to different positions. An input by which one unit of sound is selected from among a plurality of sounds that a user hears from the different positions is entered to an input unit. Then the reproduction object deciding unit determines that music data corresponding to the sound has been selected. This causes a changeover to a normal mode and the selected music data only is reproduced.

18 Claims, 8 Drawing Sheets

AUDIO REPRODUCING APPARATUS AND AUDIO REPRODUCING METHOD, ALLOWING EFFICIENT DATA SELECTION

BACKGROUND OF THE INVENTION

1. Field of the Invention

The present invention relates to an audio reproducing technology and, in particular, to an audio reproducing apparatus for reproducing one unit of audio data selected from a plurality of audio data and an audio reproducing method applied thereto.

2. Description of the Related Art

As technological developments surrounding audio data, there are the advancement of coding techniques, the arrival of larger-capacity and smaller-size storage devices, and the diversification of data acquisition routes. With these as the technological background, the number of audio data, such as music contents, possessed by individuals are increasing at an accelerated pace. At the same time, there are diversifying environments for the reproduction of audio data. For example, people can readily enjoy the realistic sensation created by a "5.1-channel surround system" or listen to a variety of music wherever they are from a portable audio player that stores a large volume of data.

When a desired piece of music among audio data in the user's possession is to be reproduced, the selection is normally done using character information such as an album name or a song title. However, if such audio data come in a large number, it is increasingly difficult to find a desired song title or the like. For example, when a large volume of audio data are stored in a portable audio player, a display provided in small equipment may have a problem of a limited number of characters it can display at a time. As a result, it may call for complicated operations such as scrolling a screen, deciphering, and selecting characters until desired data are reached.

Moreover, portable audio reproducing apparatuses, such as portable audio players and car stereos, are often used by persons during walking, in a running vehicle or in such other circumstances that do not allow them to easily read the characters displayed on a display. This further adds to the troublesomeness the user feels about the operation of selecting a song or piece of his or her choice.

SUMMARY OF THE INVENTION

The present invention has been made in view of the foregoing problems, and a general purpose thereof is to provide a technology that makes selection of a piece of audio data from a plurality of audio data easier.

An audio reproducing apparatus according to one embodiment of the present invention relates to an audio reproducing apparatus. This audio reproducing apparatus, which has an interface capable of having a user select any one of a plurality of audio data, includes: a reproducing unit which assigns sound images of a plurality of audio signals reproduced from a plurality of candidate audio data to different spatial positions around a user, and outputs the plurality of audio signals simultaneously; and an input unit which specifies a selected audio data by having the user select one of a plurality of outputted sounds that the user hears simultaneously from different directions.

The "audio data" as used herein may be any data of recorded sound, such as music data, voice data, radio programs and music contents and may also be a set of audio data composed of minimum units thereof, such as an album that contains a plurality of recorded pieces of music.

Another embodiment of the present invention relates to an audio reproducing method. This audio reproducing method includes: outputting a plurality of audio signals simultaneously reproduced from a plurality of candidate audio data, after assigning sound images of the plurality of audio signals to different spatial positions around a user; receiving an input by which the user selects one of a plurality of outputted sounds that the user hears simultaneously from different directions; and reproducing only audio data corresponding to the selected one unit of sound.

Optional combinations of the aforementioned constituting elements, and implementations of the invention in the form of methods, apparatuses, systems, and computer programs may also be practiced as additional modes of the present invention.

DETAILED DESCRIPTION OF THE INVENTION

The invention will now be described by reference to the preferred embodiments. This does not intend to limit the scope of the present invention, but to exemplify the invention.

Figure 1:
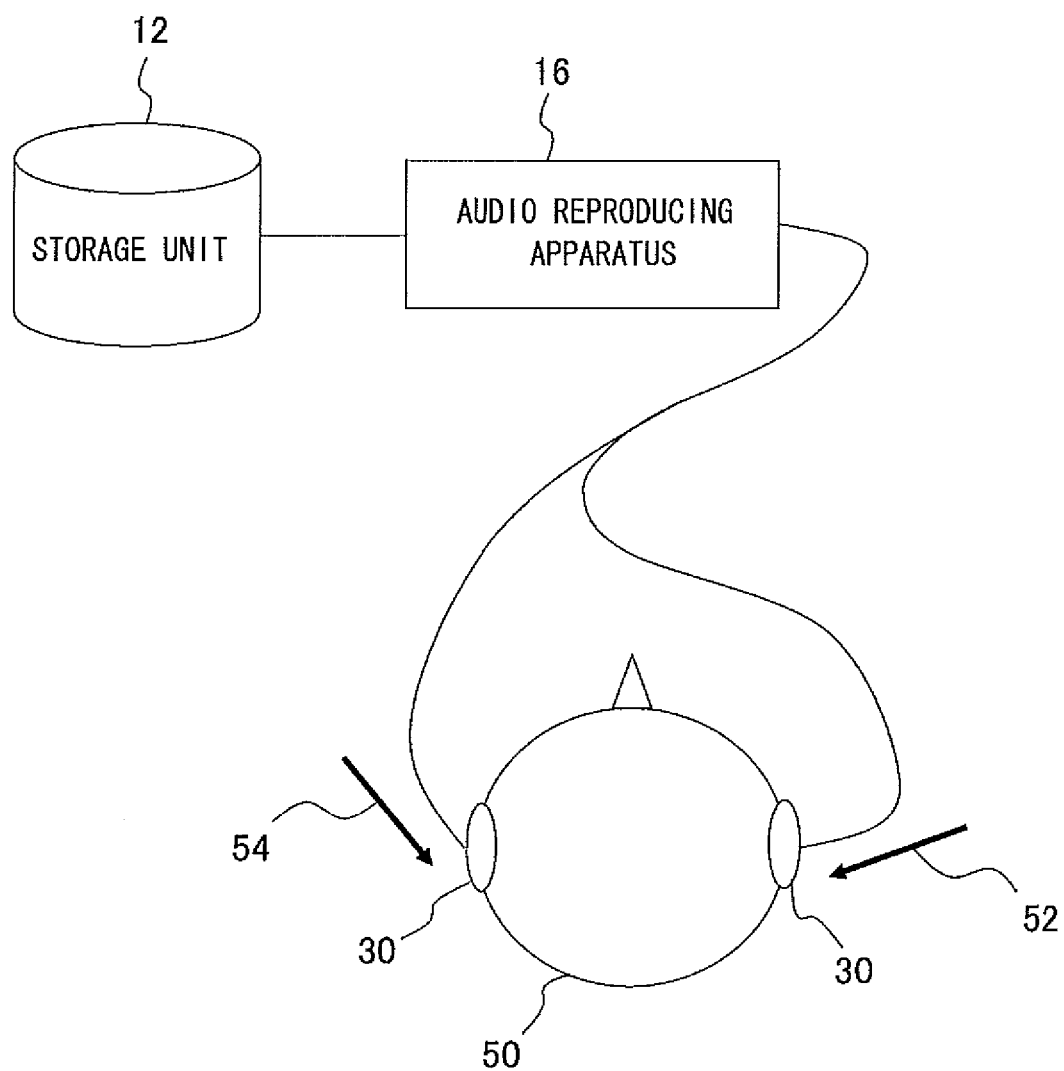
FIG. 1 is an illustration for describing in outline an audio reproducing apparatus according to the present embodiment.

FIG. 1 is an illustration for describing in outline an audio reproducing apparatus according to the present embodiment. The audio reproducing apparatus 16 according to the present embodiment reproduces audio data stored in a storage unit 12 and outputs the audio signals thus obtained to a user 50 through an output unit 30. The audio data in the following description is assumed to be music data, but this does not intend to limit the scope of this invention. Rather, the audio data may be any sound data, such as voices in a comic storytelling or a conference, sounds in a program, environmental sounds, and voices on broadcast waves.

When a user 50 tries to select a piece of music, the audio reproducing apparatus 16 acquires a plurality of candidate music data from the storage unit 12 and outputs them by simultaneously reproducing them. At this time, sound images of audio signals corresponding to the respective music data are assigned to different positions. In a simplest arrangement, two music data are reproduced as candidates, and one audio signal (arrow 52) is sent to the right ear of the user 50, and the other audio signal (arrow 54) to the left ear. In FIG. 1, a pair of earphones is used as the output unit 30, for ease of understanding, but this should not be considered as limiting. The output unit may also be a plurality of speakers or the like. Hereinbelow, a plurality of candidate music data and audio signals outputted by reproducing them are collectively referred to as "candidate pieces of music". On the other hand, the music data stored in the storage unit 12 may not necessarily be in individual pieces of music, but may also be in sets of multiple pieces of music, such as albums. Also, when the audio reproducing apparatus 16 is simultaneously reproducing the candidate pieces of music from which the user selects one as described above, the audio reproducing apparatus 16 is said to be in a "music selection mode".

The user performs a music selection by selecting one from the candidate pieces of music which he/she listens simultaneously. Hereinbelow, the music data of a selected piece of music and the audio signal outputted by reproducing it are collectively referred to as a "selected piece of music". Once a selected piece of music is determined, the audio reproducing apparatus 16 switches the music selection mode to a normal mode in which the selected piece of music only is reproduced. Or, without leaving the music selection mode, the audio reproducing apparatus 16 carries out further reproduction of candidate pieces of music related to the selected piece of music. For example, when a piece of music is to be selected from the tracks in an album, selection of either one of the pieces the user hears from the right and left may set off switch of candidate pieces of music in the recorded order or in the reverse order thereof. When three or more candidate pieces of music are to be reproduced, all the sound images of pieces are assigned to different positions. For example, all the sound images of tracks in an album may be assigned to their respective positions, from which their respective sounds reach the user simultaneously.

By selecting one out of the candidate pieces of music he/she listens simultaneously, the user may narrow the candidate pieces of music or may finally determine a selected piece of music. By this feature, the user can select music without looking at the display, and the efficiency in music selection is distinctly improved compared with the case where the user checks data one by one by looking at the characters. Further, the user selects music while he/she is listening to actual pieces of music, so that the music selection can be made even when the user has only a vague memory of the song title or the like. Moreover, even when the user has no clear idea about a specific piece of music he/she wants to listen to, a "zapping" of pieces of music can be made effectively on such occasions as when the user feels like listening to music fitting the mood of the moment or when he/she wants to check on the whole range of music he/she has recorded in the past.

Figure 2:
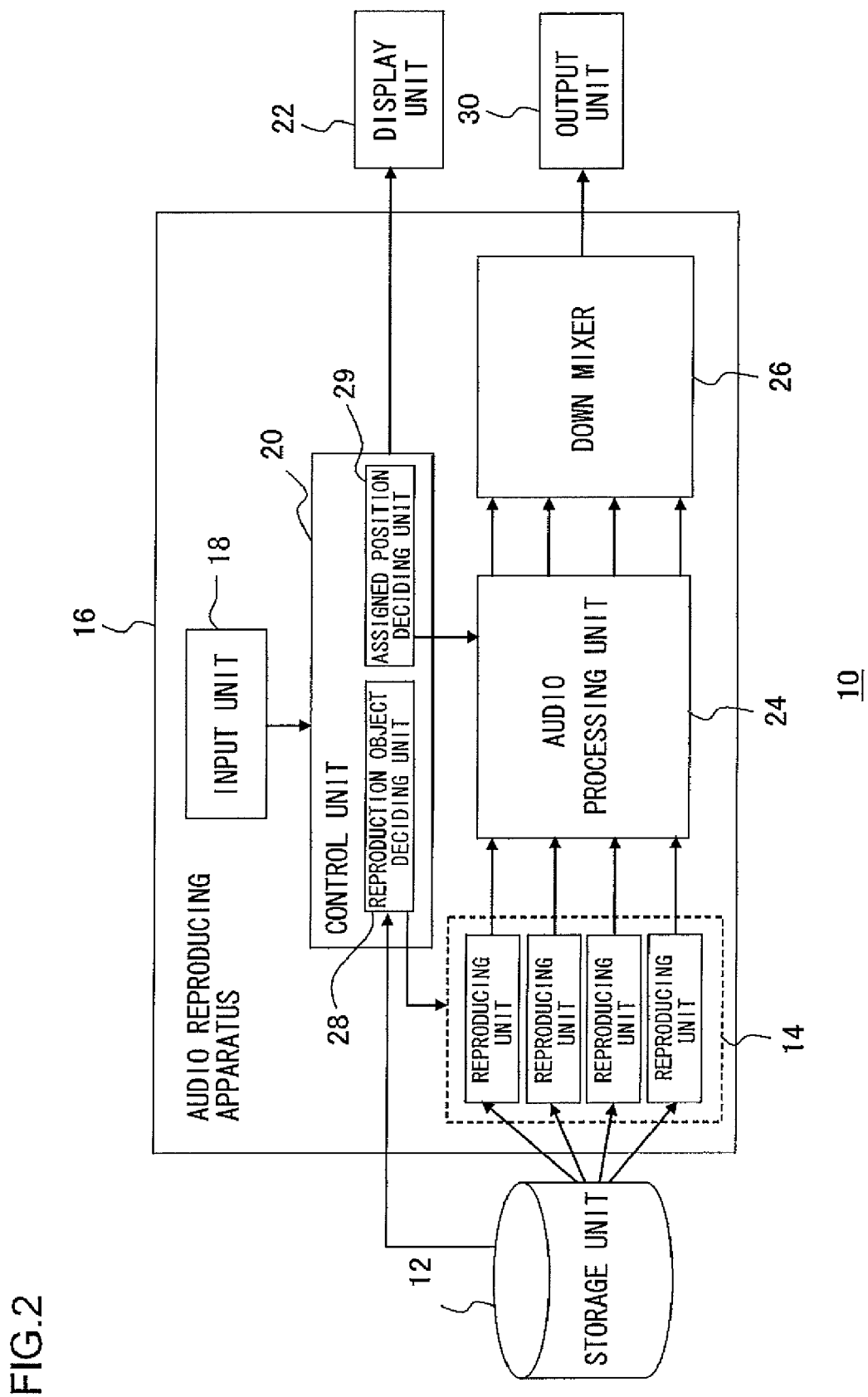
FIG. 2 illustrates a structure of an audio reproducing system that includes an audio reproducing apparatus according to the present embodiment.

FIG. 2 illustrates a structure of an audio reproducing system that includes an audio reproducing apparatus 16 according to the present embodiment. The audio reproducing system 10 includes a storage unit 12, an audio reproducing apparatus 16, an output unit 30, and a display unit 22. The storage unit 12 stores a plurality of music data. The audio reproducing apparatus 16 reproduces candidate pieces of music, assigns the sound images of them to different positions, and then outputs them as mixed audio signals in the music selection mode. The output unit 30 outputs the audio signals as sounds. The display unit 22 visually displays the information on the pieces of music currently being reproduced. It is to be noted, however, that the display unit 22 is not an essential element of the present embodiment which permits music selection without the use of visual information. Also, since the audio reproducing apparatus 16 reproduces a piece of music, in the normal mode, in the same way as an ordinary audio player, emphasis in the following description will be placed mainly on the operation thereof in the music selection mode.

The audio reproducing system 10 may be structured with integrally or locally connections like a personal computer, a music reproducing apparatus such as a portable player, or the like. In such an arrangement, a hard disk or flash memory can be used as the storage unit 12, a processor unit as the audio reproducing apparatus 16, and built-in speakers, an externally connected speakers, earphones or the like as the output unit 30. Also, as the storage unit 12, a hard disk or the like within a server connected to the audio reproducing apparatus 16 via a network may be used. The music data to be stored in the storage unit 12 may be encoded in a commonly used coding format such as MP3.

The audio reproducing apparatus 16 includes an input unit 18, reproducing units 14, an audio processing unit 24, a down mixer 26, and a control unit 20. The input unit 18 receives an instruction input about music selection from the user. The reproducing units 14 outputs audio signals by decoding music data. The audio processing unit 24 performs sound processing, including assignment of individual sound images of audio signals to their respective positions in the music selection mode. The down mixer 26 generates an output signal having a desired number of channels by mixing the processed audio signals. The control unit 20 controls the operation of the reproducing units 14 and the audio processing unit 24 and the display of the display unit 22 by determining music data to be reproduced and positions to which their sound images are assigned.

The input unit 18 provides an interface by which the user changes the positions to which the sound images of candidate pieces of music are assigned or selects a piece of music in the music selection mode. The input unit 18 may simply be an ordinary controller with operation keys. However, the audio reproducing apparatus 16 according to the present embodiment is capable of music selection by a much simpler operation, and hence it is desirable that the input unit 18 be constituted by some device that can be operated by the user's feeling inside his/her pocket or bag, for instance. Concrete examples will be discussed later.

The control unit 20 includes a reproduction object deciding unit 28 and an assigned position deciding unit 29. The reproduction object deciding unit 28 decides candidate pieces of music to be reproduced simultaneously in the music selection mode or a selected piece of music to be reproduced in the normal mode based on an instruction input from the user and communicates the decision to the reproducing units 14. The assigned position deciding unit 29 decides the positions to which the sound images of individual candidate pieces of music are assigned in the music selection mode, and updates the positions if so instructed by the user, and communicates the setting to the audio processing unit 24. If necessary, the control unit 20 also performs a control of the display unit 22 such that it displays an image or the like symbolizing the piece of music being reproduced.

The reproducing units 14 read out candidate pieces of music or a selected piece of music decided by the reproduction object deciding unit 28 of the control unit 20 from among the music data stored in the storage unit 12, and generate audio signals by decoding them. FIG. 2 shows four reproducing units on an assumption that there are four music data that can be reproduced simultaneously, but this only intends to exemplify the embodiment and the number of reproducing units is not limited to the four. Also, where parallel processing of reproduction can be performed by a multiprocessor or the like, the reproducing units 14 may have an appearance of a single unit. In FIG. 2, however, the reproducing units 14 are shown as separate processing units for reproducing individual music data and generating their respective audio signals. In the normal mode, any one of the reproducing units 14 decodes a selected piece of music.

The audio processing unit 24 carries out a processing in which the sound images of a plurality of audio signals decoded are assigned to their respective positions which have been decided by the assigned position deciding unit 29 of the control unit 20, in the music selection mode. In addition to this, the audio processing unit 24 may, as appropriate, perform preprocessing, such as gain adjustment or monauralization of a plurality of audio signals, or an aural segregation processing to have the user more easily perceive the reproduced candidate pieces of music from each other auditorily from the viewpoint other than the sound image localization. The details of such arrangements will be described later.

The down mixer 26 mixes a plurality of inputted audio signals after making various adjustments to them if required and outputs them as an output signal having a predetermined number of channels, such as monaural, stereo, and 5.1-channel. The number of channels may be fixed, or it may be such that the user can switch them by hardwarewise or softwarewise. The down mixer 26 may be constituted by an ordinary down mixer.

Figure 3:
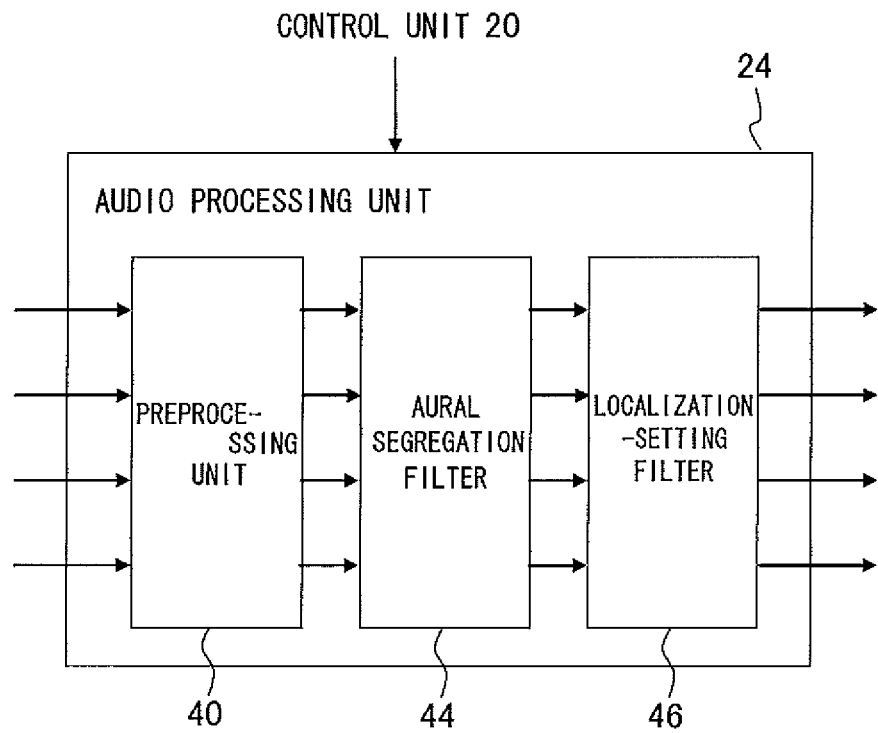
FIG. 3 illustrates a detailed structure of an audio processing unit according to the present embodiment when it performs a preprocessing or an aural segregation processing of audio signals.

FIG. 3 shows a detailed structure of an audio processing unit 24 when it performs a preprocessing or an aural segregation processing on audio signals. The audio processing unit 24 includes a preprocessing unit 40, an aural segregation filter 44, and a localization-setting filter 46. The preprocessing unit 40 performs gain adjustment so that the plurality of audio signals may become equal in effective amplitude or turns the individual audio signals into a monaural signal. In addition to this, the preprocessing unit 40 may carry out, as appropriate, any necessary processing other than the aural segregation processing or the localization setting processing. The preprocessing unit 40 can be realized by the use of an ordinary auto gain controller, converter or the like.

The aural segregation filter 44 performs processing on at least any one of a plurality of audio signals such that they can be perceived separately from each other. In FIG. 3, the aural segregation filter 44 is represented by a single block, but it may be constituted by a plurality of filters. For example, it may be any of frequency-band division filters, time-division filters, modulation filters, and processing filters, as described in the following or a combination thereof.

The frequency-band division filter divides the audible band of frequencies into a plurality of blocks and assigns each block to at least one of a plurality of audio signals. It then extracts only the frequency components belonging to the assigned blocks from each audio signal. For example, if the setting is such that the boundary frequency of each block is any of the boundary frequencies of the 24 critical bands of Bark's scale, then there will be less likelihood of a frequency component of an audio signal masking the frequency component of another audio signal. This arrangement facilitates auditory segregation in the inner ear.

The time-division filter changes the amplitude of audio signals at a common period such that peaks thereof occur at different times. That is, a time slot is allotted to each of the plurality of audio signals. The period is to be on the order of several tens to several hundreds of milliseconds. This will make it easier for the user to perceive an aurally separation by the temporal resolution ability of the inner ear.

The modulation filter causes a specific change periodically in all or any of the audio signals. For instance, it may carry out a modulation of the amplitude of the audio signals or a modulation of the frequency characteristics thereof. The modulation may be applied in pulses in a short period of time or changing gradually over a long time of several seconds. When a common modulation is applied to a plurality of audio signals, the peak timing is varied for each audio signal. Or the arrangement may be such that noise, such as clicks, is added periodically, processing practicable by an ordinary audio filter is applied or the position of the sound image is swung right and left. Thus, the user is given clues for noticing the auditory streams of audio signals by a combination of above-mentioned modulations, different modulations applied to different audio signals or staggered timing for audio signals.

The processing filter performs a processing constantly on all or any of the audio signals. The processing may be one or a combination of a variety of acoustic processings practicable by an ordinary effecter, such as echoing, reverbing and pitch-shifting. The arrangement may be such that the frequency characteristics are constantly changed from those of the original audio signals. When the processing is performed on a plurality of audio signals, the kind or degree of the processing must always be varied for each audio signal.

A plurality of audio signals outputted from the preprocessing unit 40 are thus inputted to filters such as described above, and as a result, a plurality of processed audio signals are outputted from the aural segregation filter 44. The control unit 20 performs controls concerning which of the plurality of audio signals are to be inputted to which filters or what processings are to be effected within the filters, by making necessary settings for the respective filters based on the positions assigned for the respective audio signals and so forth.

The control unit 20 may set one or more filters in such a manner that the aural perceivability level changes depending on the assigned positions. For that purpose, the audio signals that is to be with a high perceivability may be given wider frequency bands by a frequency-band division filter or more time by a time-division filter. Or the sound volume may be simply varied. For example, in an embodiment in which the sound image of a desired piece of music is shifted to the front and then selected finally as will be discussed later, the assigning of the sound image of an audio signal to the front position so that it can be heard more distinctly than the others makes it easier for the user to decide whether to select it or not.

It is to be noted that whether to perform aural segregation processing or not or how far it is to be realized by the use of the above-mentioned filter or filters constituting the aural segregation filter 44 may be determined as appropriate in consideration of the processing capacity of the processor constituting the audio processing unit 24, the clarity of actual audio signals or the necessity for aural segregation. The localization-setting filter 46 assigns sound images of audio signals to their respective positions, using a commonly used technique.

Figure 4:
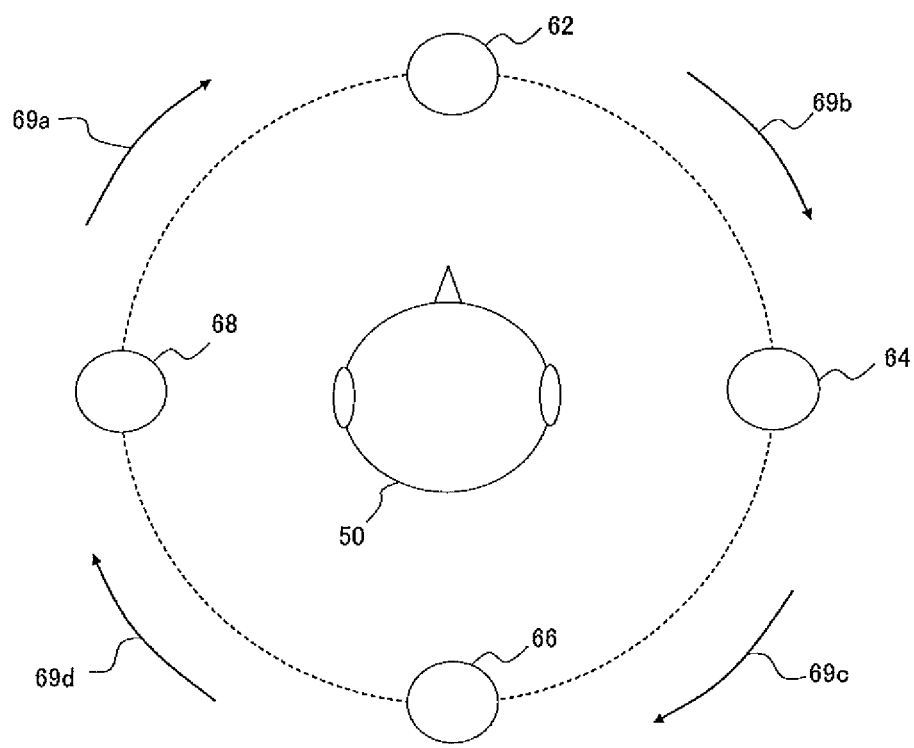
FIG. 4 illustrates a concrete example of positions to which the sound images of a plurality of music data are assigned in a music selection mode of the present embodiment.

FIG. 4 illustrates a concrete example of positions to which sound images of a plurality of music data are assigned in the music selection mode. In this example, four candidate pieces of music can be reproduced simultaneously, and their sound images are assigned to the left, front, right, and back positions of the user 50, respectively. In cases where music data of four albums are stored in the storage unit 12 or where candidate pieces of music have been narrowed down to four pieces by instruction input from the user up to the moment, the reproduction object deciding unit 28 decides the pieces of music each recorded in the first track of the four albums or the four narrowed-down pieces of music as the candidate pieces of music.

And the assigned position deciding unit 29 performs such control as to assign the sound images of the four candidate pieces of music 68, 62, 64, and 66 to the left, front, right and back positions, respectively. As a result, the user 50 listens the different pieces of music coming from the left, front, right and back positions simultaneously. At this point, if the user 50 enters an instruction input to shift the assigned positions for the sound images of the pieces of music clockwise (hereinafter referred to as "shift music forward" also) via the input unit 18, the assigned position deciding unit 29 updates the assigned positions such that the sound image of the candidate piece of music 68 shifts from left to front (arrow 69*a*), that of the candidate piece of music 62 from front to right (arrow 69*b*), that of the candidate piece of music 64 from right to back (arrow 69*c*), and that of the candidate piece of music 66 from back to left (arrow 69*d*). As the audio processing unit 24 assigns the sound images to the updated positions by setting the localization-setting filter 46 to reflect the update, the user 50 feels that the four candidate pieces of music have turned 90 degrees around him/her.

By repeating this operation, the user 50 can rotate the sound images of the four candidate pieces of music until they come from desired positions. When he/she has decided on his/her choice by listening to the four candidate pieces of music simultaneously, the user 50 "shifts the music forward" so that the chosen piece of music can be heard from front. And as a selection is entered via the input unit 18, the chosen piece of music is determined as the final selection. After this, the mode shifts to the normal mode, and the reproduction object deciding unit 28 performs control such that the selected piece of music only is reproduced. Thus, according to the present embodiment, the user can select a piece of music simply by "shift music forward" operation and "select finally" operation while listening to candidate pieces of music being reproduced simultaneously. In this music selection process, the user hears multiple pieces of music simultaneously and therefore he/she has greater freedom of choice than the selection of music with an ordinary audio player in which he/she has to reproduce individual pieces of music one by one. That is, the user can select a piece of music more efficiently and almost as if he/she is looking at a list of song titles or the like. This can be done without actually looking at the list.

Although FIG. 4 has employed four positions for assignment for ease of understanding, the efficiency in music selection may be further raised by increasing the number of positions. For instance, even when ten albums are stored in the storage unit 12, an album selection may be made in the same way as described above by assigning them to ten positions. In the present embodiment, the assigned positions are a means by which the user 50 is given a sense that he/she is shifting a desired piece of music to the front, so that there is no great necessity for the user to clearly distinguish the sounds coming from positions other than the front or its neighboring positions. Hence, when there are many candidate pieces of music, it is not necessary that the assigned positions be arranged at equal intervals. For example, the assigned positions may be arranged closer together in the back area of the user 50 and wider apart in the front area. Also, for the same reason, a plurality of music data may be assigned to a single position in the back of the user 50.

In a case where there are a larger number of candidate pieces of music than the number of positions for assignment, one candidate piece of music may be replaced by another at each shifting unlike the case of FIG. 4 in which the same pieces of music are rotated. For example, in FIG. 4, the shifting of arrow 69*d* is eliminated, and instead the candidate piece of music 66 having been assigned to the back position is excluded from the objects of reproduction at an instruction input of "shift music forward". And a new candidate piece of music is assigned to the left position. In this case, too, the user can select a piece of music simply by "shift music forward" operation and "select finally" operation while listening to the candidate pieces of music. Also, because of the feature of simultaneous hearing of a plurality of candidate pieces of music, the efficiency in music selection, even when there are only two assigned positions, for example, right and left, will be nearly twice as high as an ordinary selection process in which the user listens to candidate pieces of music one by one. And it goes without saying that the more the assigned positions, the higher the selection efficiency will be.

In the example of FIG. 4, the assigned positions are arranged circular with the user 50 in the center, but their arrangement may be in other figures. For example, they may be arranged on the sides of a quadrangle or on straight lines. Furthermore, they may be arranged above and below the user, or on a spherical surface, a cubic surface or the like. Also, the position where the user finally selects a piece of music does not have to be the front, but it may be set at any position by reminding the user of it beforehand. In other words, the arrangement of assigned positions and the destination to which a piece of music to be selected is shifted may be optionally determined as long as such positions can give the user an impression that he/she is moving a desired piece of music closer to the destination by operating the input unit 18.

Also, such positions may be so arranged as to meet the tastes of the user. For example, where an audio reproducing apparatus is to be operated in the user's own room, the positions may be assigned such that they correspond to the positions of various objects placed in the room. Information concerning the positions to be assigned is to be stored in a memory (not-shown) that the assigned position deciding unit 29 can access for reference when it assigns sound images of candidate pieces of music to them.

Figure 5:
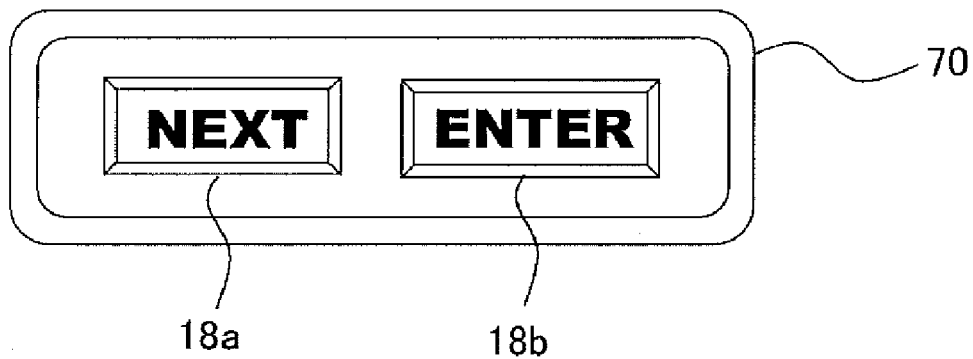
FIG. 5 is a front view of a controller as an example of an input unit in the present embodiment.

FIG. 5 is a front view of a controller, as an example of the input unit 18, which realizes the operation of an audio reproducing apparatus 16 as described hereinabove. The controller 70 may be housed in a separate enclosure connected to the body of an audio reproducing apparatus 16 or may be installed directly on the surface of the body of an audio reproducing apparatus 16. When a separate enclosure is used, the connection may be wired or wireless. The controller 70 includes a "NEXT" button 18*a* and an "ENTER" button 18*b*. The "NEXT" button 18*a* is a button for entering an instruction input of "shift music forward" by which the positions assigned for candidate pieces of music are shifted, and the "ENTER" button 18*b* is a button for entering an instruction input of "select finally" by which the candidate piece of music assigned to the front is finally determined as the selected piece of music.

As described hereinabove, music selection according to this embodiment does not rely on visual information, so that the operation for selecting a piece of music can be performed with these two buttons. With the input unit 18 structured as simple as this, the user can carry a controller 70 inside a coat or trouser pocket and select music by touch. Moreover, since the operation itself is simple, the user can select music while doing something else.

It should be understood that variations of instruction inputs may be further increased by the way the buttons of the controller 70 are pressed or according to the conditions when they are pressed. For example, the arrangement may be such that pressing the "NEXT" button 18a in the normal mode causes a changeover to the music selection mode or that pressing the "NEXT" button 18a twice in succession in the music selection mode reverses the direction of shifting music.

Figure 6:
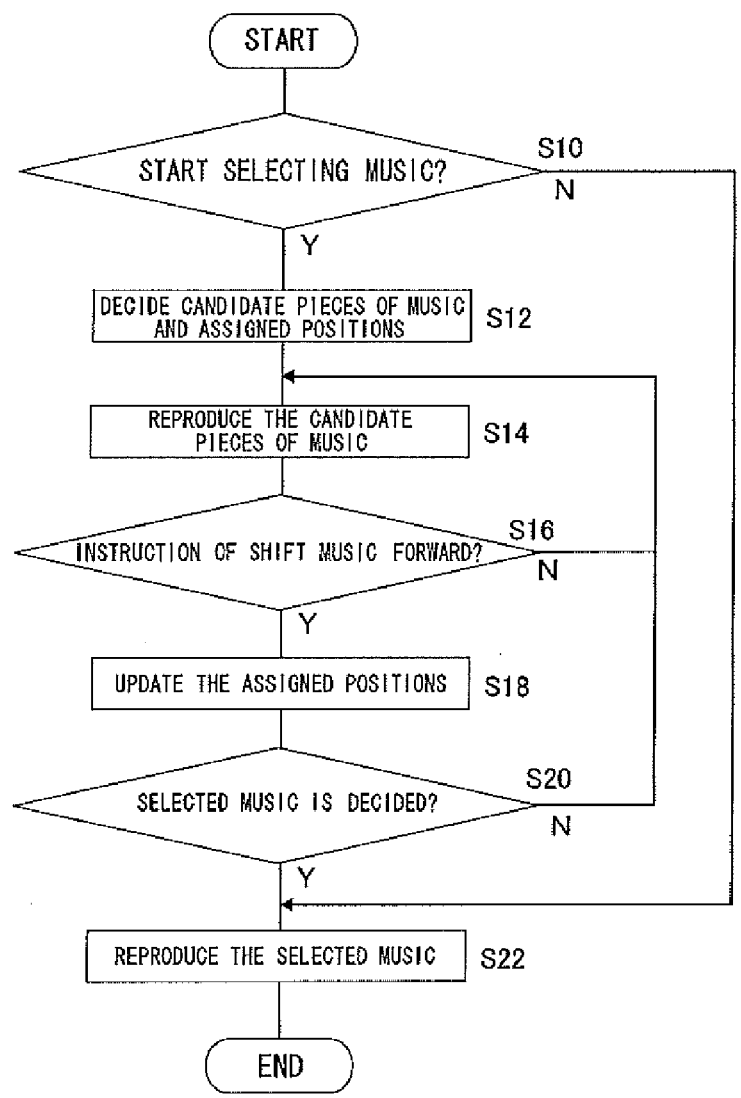
FIG. 6 is a flowchart showing an operation procedure of an audio reproducing apparatus according to the present embodiment.

Now a description will be given of an operation of an audio reproducing apparatus 16 realized by a structure as described so far. FIG. 6 is a flowchart showing an operation procedure of the audio reproducing apparatus 16. First the reproduction object deciding unit 28 detects a sign that indicates the user's desire to select music (Y of S10). More specifically, a detection is made when the audio reproducing apparatus 16 has started operating or when the user has entered an instruction input to that effect to the input unit 18. Thereupon, the reproduction object deciding unit 28 decides a plurality of music data as candidate pieces of music, and the assigned position deciding unit 29 decides the positions to which the sound images of the candidate pieces of music are assigned, respectively (S12). Information on the candidate pieces of music is given to the reproducing units 14, and information on the positions to which they are assigned is given to the audio processing unit 24.

The candidate pieces of music to be decided by the reproduction object deciding unit 28 may be selected in an order of storage by the storage unit 12 or in some other sequence such as an order sorted by album, music title or performer. Also, candidate pieces of music that have some relevance to the pieces of music reproduced just before may be extracted through analysis of various information provided by the pieces of music reproduced just before. For example, selection may be made one by one from a group of music having some relevance, such as the pieces of music played by the same performer as one of the pieces of music reproduced just before, those played by similar performers, those belonging to the same genre or those having completely opposite characteristics. The pieces of music reproduced just before may be included among the candidate pieces of music.

Next, the reproducing units 14, the audio processing unit 24 and the down mixer 26 output the candidate pieces of music decided by the reproduction object deciding unit 28 by reproducing them simultaneously and assigning their sound images to positions decided by the assigned position deciding unit 29 (S14). The user listens to the sounds outputted from the output unit 30. When the user gives an instruction of "shift music forward" to the input unit 18 (Y of S16), the assigned position deciding unit 29 updates the positions to which the sound images of the candidate pieces of music are assigned by shifting the assigned positions by one position each (S18).

The user shifts a desired piece of music to the front or any other predetermined position by repeating the instruction input of "shift music forward" and then selects it as the selected piece of music finally. When an instruction input indicating a final music selection is entered (Y of S20), the reproduction object deciding unit 28 gives information on the selected piece of music to a reproducing unit 14 and the reproducing unit 14 starts reproducing the selected piece of music only (S22). At this time, there is only one piece of music that is reproduced, so that the audio processing unit 24 and the down mixer 26 may be stopped or part of them may be operated as required. Without an instruction input of "shift music forward" or final music selection (N of S16, N of S20), the reproduction of candidate pieces of music is kept on in the same condition (S14).

Through the operation as described above, the user can select a desired piece of music from among multiple pieces of music and reproduce it. And if the user enters an instruction input indicating a desire to do another music selection, for instance, while listening to a selected piece of music, then the music selection mode will be turned on and a processing as described above will be carried out (Y of S10, S12 to S20). Or if he/she does not, the user can keep listening to the pieces of music in turn from the selected piece in the normal mode (N of S10, S22).

Figure 7:
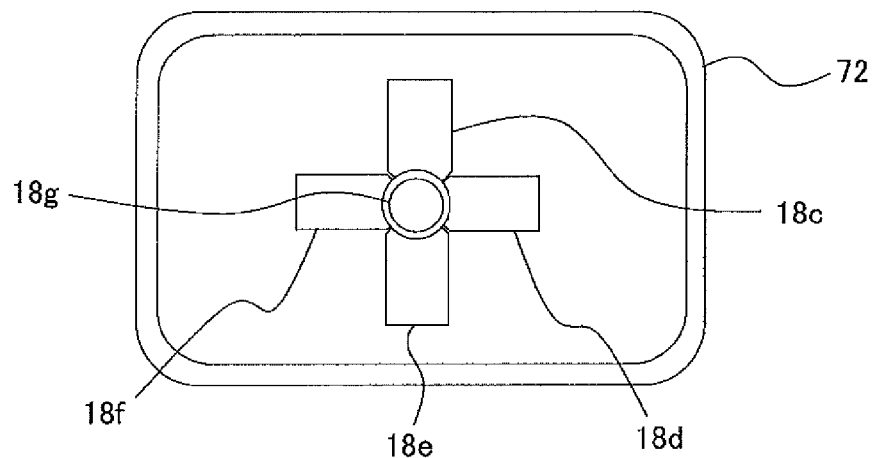
FIG. 7 is a front view of a controller which is another example of the input unit in the present embodiment.

Now a description will be given of another example of the input unit 18 that can realize the operation of the audio reproducing apparatus 16 in a similar manner. FIG. 7 is a front view of a controller that has a structure different from that of FIG. 5. As with the controller 70 shown in FIG. 5, the controller 72 may be installed directly on the body of an audio reproducing apparatus 16 or may be housed in a separate enclosure. The controller 72 includes four direction pointing buttons 18c, 18d, 18e and 18f and a music shift button 18g.

With the controller 70 shown in FIG. 5, the user shifts the assigned positions of sound images so that he/she can hear a desired piece of music from front, and then selects it finally as the selected piece of music. With the controller 72 introduced, on the other hand, the user can select one of the four candidate pieces of music coming from four directions by pressing the relevant one of the direction pointing buttons 18c, 18d, 18e and 18f. The number of the direction pointing buttons is not limited to four, but it may be increased or decreased according to the number of positions to which sound images are assigned. However, it is desirable that the number thereof be such that the user can select a piece of music by distinguishing the directions of all the assigned pieces of music. And when a selection is to be made from many candidate pieces of music, the process is made by the replacement of candidate pieces of music, which is effected by the pressing of the music shift button 18g to shift the assigned positions of sound images.

Figure 8:
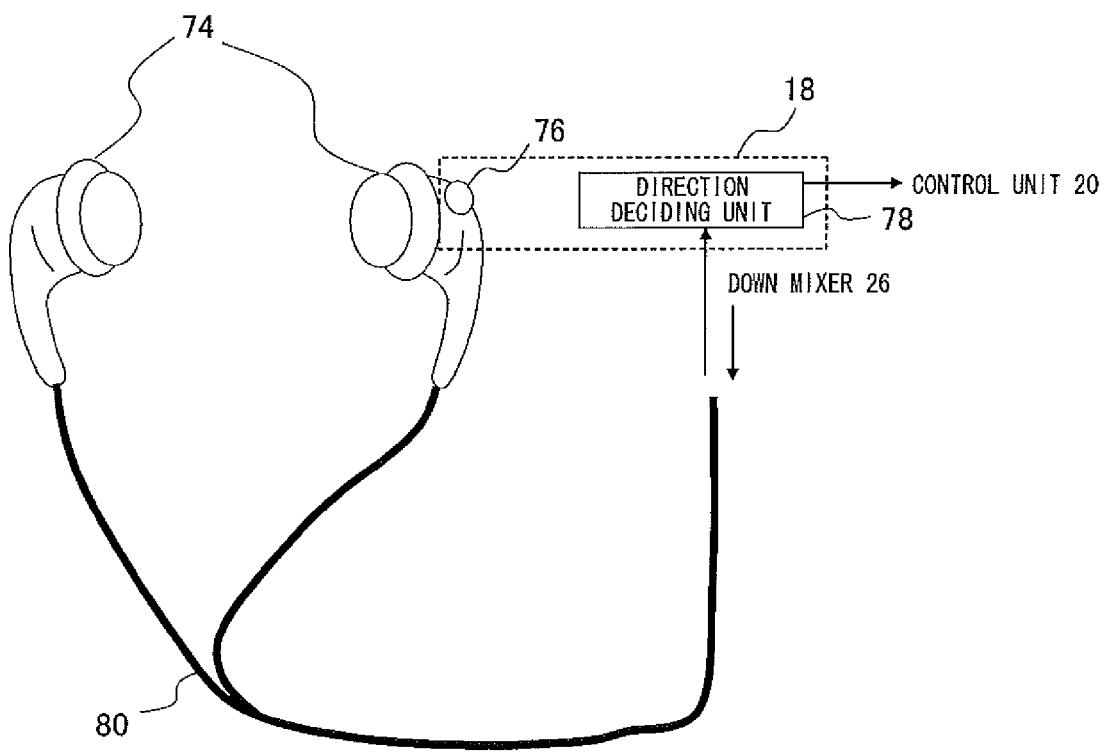
FIG. 8 illustrates a configuration of a pair of earphones, which serves also as an input unit, according to the present embodiment.

Next, as another example of the input unit 18, a description will be given of a mode in which input is made by a method other than button operation. FIG. 8 illustrates an arrangement in which a pair of earphones serves also as an input unit 18. The earphones 74 are provided with an acceleration sensor 76 in the part fitted to each ear. And together with a direction deciding unit 78 provided in the body of an audio reproducing apparatus 16, it constitutes an input unit 18. In this arrangement, the direction the user's face turns to is detected, and the candidate piece of music assigned to this direction is selected as the selected piece of music. Although earphones are illustrated in FIG. 8, they, in the following description, may be replaced with a headphone or any other device which the user puts on to listen to music. Also, the acceleration sensor 76, in the following description, may be any sensor coming with a gyrosensor or the like, as long as it can detect any of the acceleration, angular velocity, displacement and the like of an object. In what is to follow, such a sensor is the acceleration sensor 76.

The earphones 74 not only output audio signals received from the down mixer 26 through a cable 80 but also detect the acceleration of the user's head with the earphones 74 on by the operation of the acceleration sensor 76. Information on the detected acceleration is communicated to the direction deciding unit 78 via the cable 80. The direction deciding unit 78 calculates the orientation of the user's face based on the acquired information on the detected acceleration. Note that existing technology may be employed as a technique for calculating the orientation of the user's face from the acceleration.

In the music selection mode, the reproduction object deciding unit 28 of the control unit 20 decides the candidate piece of music assigned to the position corresponding to the direction the user is facing as the selected piece of music from among a plurality of candidate pieces of music. In this manner, the user can select a piece of music simply by turning his/her face in the direction from which he/she hears a desired piece of music. This mode of operation may be only possible in the present embodiment which associates music with the direction from which it can be heard. The more the objects, such as a display or controller, that are present between music data and the movement of the user, the greater the troublesomeness of operation the user feels and the possibilities of operation error will be. With input given through the earphones 74, the user can select music simply by turning his/her face in the direction from which a desired piece of music is coming. Therefore, there is a direct connection between music data and the movement of the user, and consequently there will be fewer operation errors because of the great affinity of the human interface.

When the positions to which sound images of candidate pieces of music are assigned correspond to the positions of various objects placed in the user's own room as described earlier, the user can derive a kind of amusement from a feature that a piece of music assigned to the position of an object is selected when the user turns his/her face toward the object.

Note that the present embodiment may also be carried out without the cable 80 if the transmission and reception of data between the earphones 74 and the audio reproducing apparatus 16 are performed wirelessly using radio waves or such other existing technology. Also, the acceleration sensor 76 may be worn on a part of the body of the user instead of fitted on the earphones or headphone. This way, an optimum input method can be selected according to the environment the user is in or any physical handicap he/she may have. Further, the input unit 18 may be constituted by a combination of earphones 74 fitted with an acceleration sensor 76 and a controller as shown in FIG. 5 or FIG. 7. For example, the arrangement may be such that simply turning toward the direction in which the user hears a desired piece of music does not select the music, but it can be finally selected only when a final selection button is pressed. In this case, too, necessary operation via the button is limited, and music selection can be done quite easily.

Figure 9:
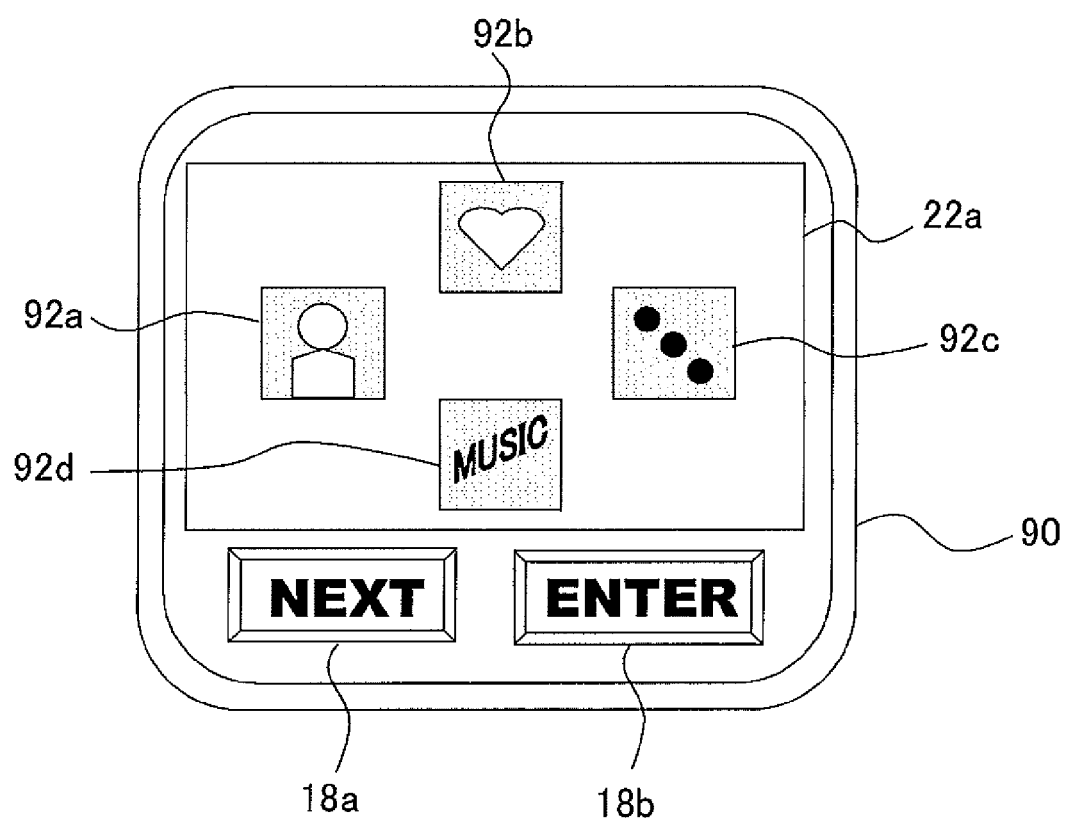
FIG. 9 is a front view of a controller, which serves also as a display unit, according to the present embodiment.

Next, a description will be given of an example in which an input unit 18 and an output unit 30 are integrated in a single structure. FIG. 9 is a front view of a controller which serves also as a display unit. A controller 90 includes a display screen 22*a*, a "NEXT" button 18*a* and an "ENTER" button 18*b* The functions of the "NEXT" button 18*a* and the "ENTER" button 18*b* are the same as those of the "NEXT" button 18*a* and the "ENTER" button 18*b* of the controller 70 shown in FIG. 5. The controller 90 displays an image symbolizing a piece of music being reproduced on the display screen 22*a*. An image symbolizing music data may be an image from an album jacket, a frame from a promotion video, a moving image of a promotion video, an image of the sender of music data being played, or simply a title or such other character information turned into image data.

In the music selection mode, all images symbolizing candidate pieces of music being reproduced simultaneously are displayed on the display screen 22*a*. At this time, the images displayed are so arranged as to reflect the positions to which the respective pieces of music are assigned. In the example of FIG. 9, it is assumed that the user is listening to four candidate pieces of music of which sound images is assigned to the left, front, right and back positions, and thus the images symbolizing them are being displayed in the left (92*a*), top (92*b*), right (92*c*) and bottom (92*d*) positions, respectively, on the display screen 22*a*. When an instruction input of "shift music forward" is entered through the "NEXT" button 18*a*, the control unit 20 updates the assigned positions of the sound images and at the same time changes the arrangement of the images on the display screen 22*a* in such a manner as to reflect the updated positions. When a piece of music is finally selected through the "ENTER" button 18*b*, the normal mode is set and the image symbolizing the selected piece of music only is displayed.

In an embodiment like this, if the user can check the display screen 22*a*, the user can visually confirm which pieces of music are coming from which directions in the music selection mode. This confirmation of music can be obtained very efficiently because a plurality of music data can be checked visually at once. Also, the display of images in an arrangement reflecting the assigned positions of sound images allows the user to get an intuitive grasp.

With an audio reproducing apparatus thus far described, a piece of music is selected and reproduced from among candidate pieces of music reproduced simultaneously or from among the candidate pieces of music replaced at an instruction input of "shift music forward". However, as the number of music data stored in the storage unit 12 increases, there may be cases where it takes much time to reach a desired piece of music despite the simultaneous confirmation of a plurality of candidate music. Therefore, as will be described below, the efficiency in music selection may be further improved by utilizing classification information associated with the music data.

To put it concretely, a selected piece of music is not reproduced immediately, but the music selection selects a category the piece of music belongs to. And pieces of music belonging to the selected category are reproduced as new candidate pieces of music. By narrowing down the candidate in this manner, the user can reach a final selection of music as efficiently as when selecting the category from character information, and can reach it without looking at any character information. Moreover, compared with when selecting the category from character information, the user can perform the narrowing-down relying more on his/her senses, so that he/she has a better chance of reaching a desired piece of music even when he/she has only a hazy memory of the category the desired piece of music belongs to, such as performer, music album name and the like.

Figure 10:
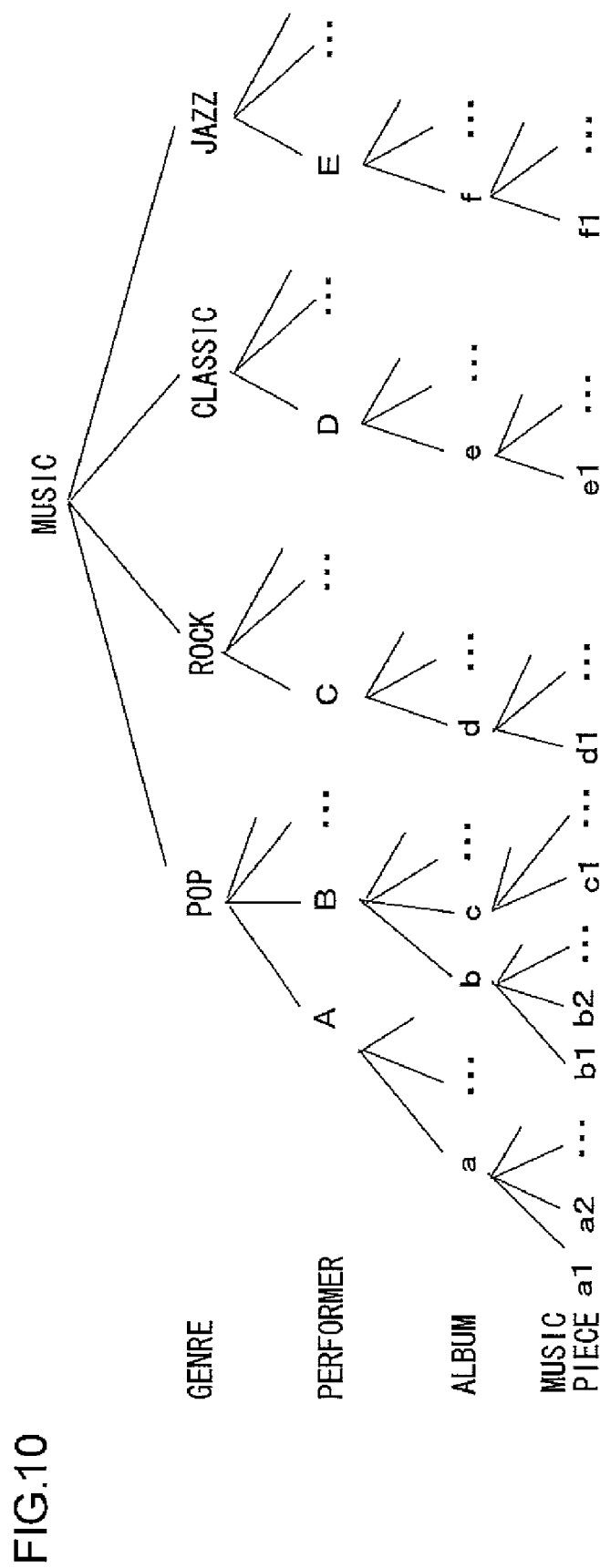
FIG. 10 illustrates an example of classification structure of music utilizable in the present embodiment.

FIG. 10 illustrates an example of classification structure of music that can be used in such an embodiment. As shown in FIG. 10, the classification of music may be represented in a hierarchical structure of genre, performer, album and so forth. This classification is only an example, and the structure may be optional; the music may be classified by composer instead of performer, or classification by release year may be placed above that by album. Also, the same performer or the same album may be categorized into two or more groups. Information normally attached to music data stored in the storage unit 12 can be utilized in such classification.

The processing for music selection is carried out as follows. The reproduction object deciding unit 28 selects a candidate piece of music from each genre by firstly focusing attention on classification by genre. Where music data as shown in FIG. 10 are stored, a piece of music "a1" belonging to "pop", a piece of music "d1" belonging to "rock", a piece of music "e1" belonging to "classic", and a piece of music "f1" belonging to "jazz" are selected and reproduced simultaneously. To this, the user, while listening to the four candidate pieces of music being reproduced, selects one of them using the input unit 18 based on the similarity to his/her desired piece of music or according to the mood of the moment.

Suppose that the piece of music "a1" is selected at this point, then the reproduction object deciding unit 28 decides that the genre of "pop" has been selected. Next, a candidate piece of music from each performer belonging to "pop" is selected. In the example of FIG. 10, a piece of music "a1" by performer "A" and a piece of music "b1" by performer "B", for instance, are selected and reproduced simultaneously. And if the user, listening to them, selects the piece of music "b1", the reproduction object deciding unit 28 decides that performer "B" has been selected. And next, a piece of music "b1", a piece of music "c1" and the like from an album "b", an album "c" and the like, respectively, which have been released by performer "B" are selected and reproduced simultaneously.

Then, if the user selects the piece of music "b1", for instance, it will be decided that the album "b" has been selected, and a piece of music "b1", a piece of music "b2" and the like recorded in the album "b" will be reproduced as candidate pieces of music. If the user selects a piece of music at this point, then this piece of music will be decided as the finally selected piece of music and reproduced. The arrangement may also be such that a selected piece of music can be determined in selecting each hierarchical group of classification and the music selection mode can be switched to the normal mode in preparation for cases where the user wants a piece of music reproduced in an upper hierarchical level of classification, such as album or performer.

It is not necessary that the classification to be used in music selection is in a hierarchical structure as shown in FIG. 10. For example, the reproduction object deciding unit 28 may analyze the music the user has reproduced and store the information on his/her favorite types of music into the storage unit 12. Then the reproduction object deciding unit 28 can combine such preference with a classification such as shown in FIG. 10. This will increase variation of options and allow music selection from a wider range of viewpoint. For example, one piece each of music may be extracted from the pieces of music belonging to such categories as "suiting user's taste and music of the same genre as the currently selected piece", "suiting user's taste and music of the genre different from the currently selected piece" and "not suiting user's taste but music of the same genre as the currently selected piece", and those extracted pieces of music are reproduced as candidate pieces of music simultaneously.

With an audio reproducing apparatus 16 having features as described above, the user can select music while actually listening to candidate pieces of music which have been selected from various angles such as the user's preference or reproduction history. As a result, the user may be able to reproduce a desired piece of music he/she has intended or may happen upon an unexpected piece of music or may arrive at an album that agrees with the mood of the moment. In this manner, the user comes across new discoveries which can be realized only by listening to pieces of music actually, so that the user can enjoy exploring a musical space.

Figure 11:
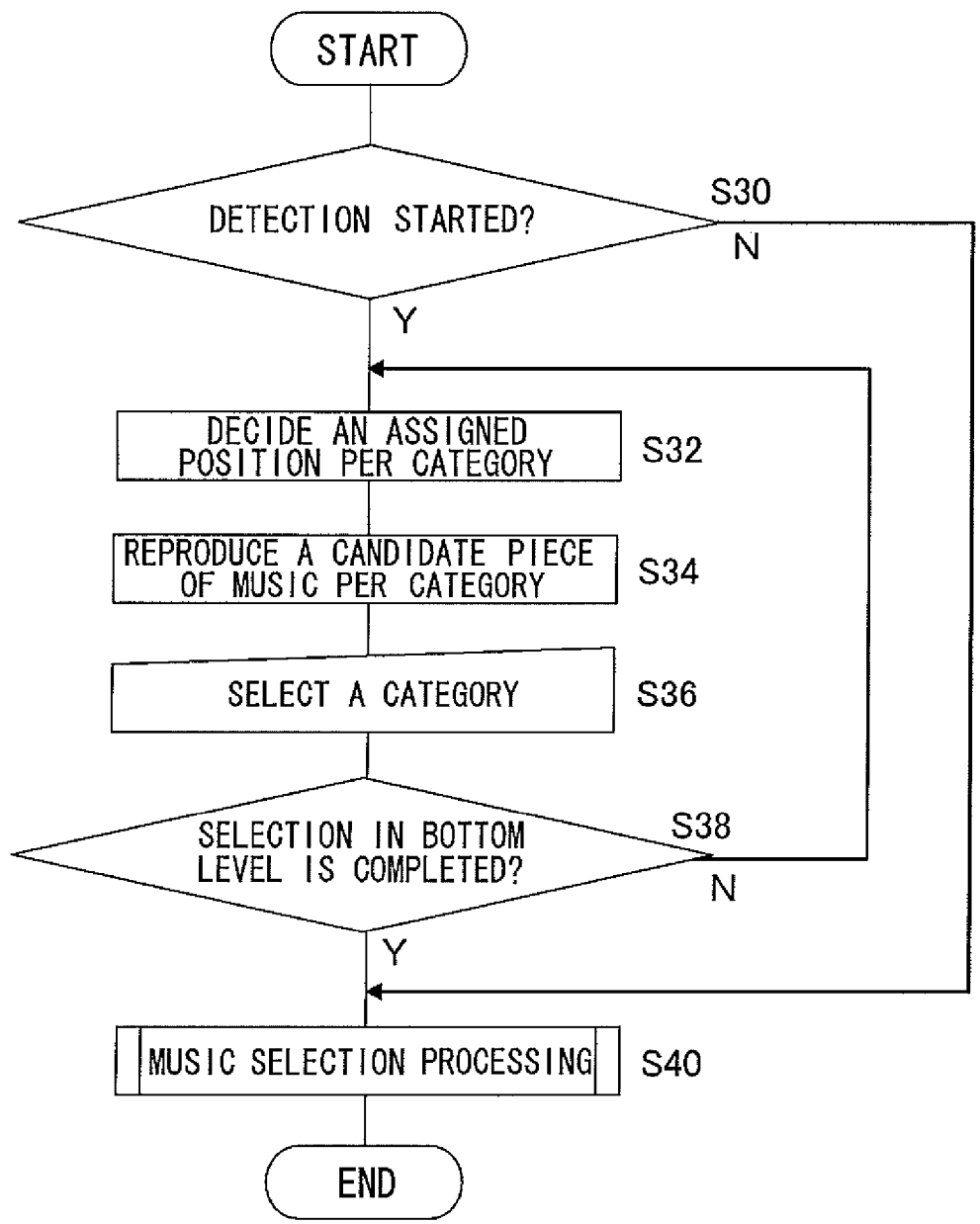
FIG. 11 is a flowchart showing an operation procedure of an audio reproducing apparatus when the selection method by music classification is employed in the present embodiment.

FIG. 11 is a flowchart showing an operation procedure of the audio reproducing apparatus 16 with which music selection by classification as described above is employed. First the reproduction object deciding unit 28 detects a sign that indicates the user's desire to select music by classification (Y of S30). More specifically, a detection is made when the audio reproducing apparatus 16 has started operating or when the user has entered an instruction input to that effect to the input unit 18. Note that if the user does not desire music selection by classification (N of S30), the mode will be switched to the direct music selection which has been explained with reference to FIG. 6 (S40).

When music selection by classification is started (Y of S30), the assigned position deciding unit 29 identifies a classification method for the top level in the hierarchical structure and decides the positions to which the categories are assigned, respectively (S32). As for classification method for each hierarchical level, those predetermined may be stored in memory (not shown) which the assigned position deciding unit 29 or the like can reference. A plurality of patterns of hierarchical structure may be prepared, so that the user can select one according to his/her preference.

Then, as the reproduction object deciding unit 28 selects one each from the pieces of music belonging to each category, a plurality of candidate pieces of music belonging to a plurality of categories are reproduced (S34). A piece of music belonging to each category may be selected by referring to the additive information stored together with music data in the storage unit 12 or by referring to a hierarchical structure table of classification as shown in FIG. 10, which is prepared at the initial starting of the audio reproducing apparatus 16 and stored in memory or the like. In S34, the audio processing unit 24 assigns the sound images of the candidate pieces of music to their respective positions according to the decision of the assigned position deciding unit 29 in S32 and makes their output.

The user selects a category by entering in the input unit 18 an instruction input for selecting one of the candidate pieces of music which he/she hears simultaneously (S36). The procedure of S32 to S36 is repeated until the selection of a category at the bottom level in the hierarchal structure (N of S38). When the selection of the category at the bottom level, namely, the selection of an album in the example of FIG. 10, is completed (Y of S38), the mode is switched to the direct music selection as shown in FIG. 6 (S40). In the example of FIG. 10, the pieces of music recorded in the album are reproduced as candidate pieces of music, and one piece of music selected from them becomes the final selection. Note that the decision of S38 as mentioned above may be made based on whether the user has entered an instruction input to end music selection by classification or not, instead of whether the selection of the category at the bottom level has been completed or not.

According to the present embodiments heretofore described, sound images of a plurality of candidate audio data are assigned to different positions and reproduced simultaneously when the user selects a piece of music therefrom. As a result, the user can make a selection of audio data by choosing one of a plurality of outputted sounds that he/she hears simultaneously from different directions. In this music selection, the user can change the position assignment of the sound images or shift the positions from which the sound are heard. Thus, the user can move a desired sound to a specific position or replace candidate pieces of music with new ones. This allows the user to make a music selection intuitively while enjoying the movement of sounds. Since the user makes a selection while listening to actual sounds, there is no need for him/her to check character information, such as titles or performers, which are attendant upon the audio data. Without the trouble of looking at the display, selections can be made with simple operation. Moreover, even when the user only has a vague memory of character information or cannot find desired audio data readily, he/she can make selections by actually listening to sounds.

Furthermore, since the sounds of candidate audio data can be heard simultaneously, the user can check the respective audio data in a short time, which results in an improved selection efficiency. Addition of certain processings for aural segregation of audio signals reduces the trouble of the sounds canceling each other, thus making it easier for the user to recognize the respective candidate sounds.

Also, constituting the input unit by an acceleration sensor fitted on an earphone or the like makes music selection possible by the orientation of the user's face. That is, the user, going through a natural movement of turning his/her face in the direction from which he/she hears a desired sound, can select the music. This not only simplifies the operation for selection input but also reduces operation errors. Also, images corresponding to audio data being reproduced are displayed in an arrangement corresponding to the assigned positions, and the displayed arrangement is updated in linkage with the shifting of the assigned positions. Thereby, if the user wants to visually check, the images can be associated with the audio data intuitively based on the displayed positions.

Also, the preferred embodiments include a mode in which audio data are not only selected directly but also narrowed down step by step as the user selects categories in the process. Such a mode enables the user to reach desired data efficiently even when there are a large number of audio data stored in the storage unit. Furthermore, the user can actually listen to the sounds of audio data belonging to a variety of categories, and therefore he/she can find an amusement in zapping audio data and making unexpected or new discoveries.

The present invention has been described in conjunction with the embodiments. These embodiments are given solely by way of illustration. It will be understood by those skilled in the art that various modifications to the combination of each component and each process thereof are possible and that such modifications are also within the scope of the present invention.

The embodiments have been described mainly in a preferred mode in which music selection is made from audio data stored in a storage unit, but it is not necessary that audio data be stored in the storage unit. For example, audio data may come from news programs on the radio, Internet radio programs or music contents delivered over a network or a combination thereof.

For example, a GPS (Global Positioning System) may be mounted on the audio reproducing apparatus. Then the user can receive music or a program of great relevance to the location where he/she is now walking as a candidate piece of audio data, in addition to the audio data stored in the storage unit. Thus, the sound images of all the data are assigned to different positions so that the user can select one from them by listening to them simultaneously. In this modification, the audio reproducing apparatus may further obtain user's walking speed and direction, using the GPS function, and shift the assigned position of such data at the same speed and in the opposite direction. Then the user can experience an illusion that the source of the sounds is fixed at a certain location in town and he/she is passing there.

An arrangement like this can save the user from the annoyance of unwanted contents or sounds from the radio or the like following him/her around and thus let him/her take them as general noises of town. However, if he/she happens to like the content, the user may choose it by walking closer to the source of the sound. The operation of the audio reproducing apparatus in this application is the same as that described in the foregoing embodiments in which an acceleration sensor is used as an input means.

Also, in the foregoing embodiments, a description has been given of a mode in which a candidate piece of music is replaced by another when the assigned positions for candidate pieces of music are shifted at an instruction input of "shift music forward". However, the number of pieces of music to be replaced may be more than one; for example, all the candidate pieces of music may be replaced with others. The arrangement in such a case may be such that the number of pieces of music to be replaced increases relative to the length of time for which the user keeps holding down the button or the like used for an instruction input of "shift music forward". In this case, too, the user can select music simply by the operation of "shift music forward" and "select finally" only. Besides, he/she can remove any unwanted piece of music immediately in a manner of "fast forward", so that the efficiency in music selection further improves.

The shifting of assigned positions of sound images of candidate pieces of music by the input unit 18 is not limited to a forward shifting in a predetermined direction as illustrated in FIG. 4. It may be front and back or right and left replacement or any other shifting. The arrangement may be such that the user can select any from a plurality of shifting patterns like these.

Moreover, these embodiments may be applied to audio signals reproduced by video reproducing devices such as TV receivers. In such a case, the objects from which selections are made are video data including audio signals. And video thumbnails or the like of a plurality of candidate video data are displayed on a multiple-screen display, and at the same time individual sound images of audio signals are assigned to different positions and reproduced. At this time, as with the display screen of a controller as shown in FIG. 9, the video thumbnails are displayed at positions corresponding to the positions assigned for the audio signals. In this manner, when a TV program is to be selected from the multi-screen display, the user can make the selection by listening to audio output at the same time.

Or, irrespective of whether the multi-screen display is made with the TV receiver or the like or not, it may be so arranged that audio signals from programs on other channels, which are so-called counterprograms, are also reproduced simultaneously with the display of a main program. In such a case, the sound image of the audio signals from the main program are assigned, for instance, to the front of the user and the sound images of the audio signals from one or more counterprograms to the back, and in addition, the audio signals from the main program are so processed that they can be emphasized by the aural segregation filter 44. And when the user specifies a counterprogram, the audio and video outputs are switched so that the selected program becomes a main program. In this manner, the user can aurally follow the progress of programs on the other channels, such as the end of a commercial break or a special development in a sports broadcast, so that he/she can watch desired programs without visual help.

What is claimed is:

1. An audio reproducing apparatus having an interface by which to have a user select any one of a plurality of audio data, the apparatus comprising:
a reproducing unit which assigns sound images of a plurality of audio signals reproduced from a plurality of candidate audio data to different spatial positions around a user, and outputs the plurality of audio signals simultaneously; and
an input unit which specifies a selected audio data by having the user select one of a plurality of outputted sounds that the user hears simultaneously from different directions,
wherein, the reproducing unit further performs processing for providing different aural perceivability levels, other than a sound image localization, to the audio signals of the plurality of candidate audio data depending on the assigned spatial position, so that the aural perceivability of an audio signal assigned to a specific spatial position is always high even when the audio signal assigned to the specific spatial position is changed.

2. An audio reproducing apparatus according to claim 1, wherein the input unit includes a displacement instruction input unit which receives an instruction input to vary a position to which each of sound images of the audio signals is assigned, and wherein, in accordance with the instruction input to vary, the reproduction unit assigns each of the sound images of the audio signals to a new position and simultaneously outputs the audio signals.

3. An audio reproducing apparatus according to claim 2, wherein, in accordance with the instruction input to vary, the reproducing unit replaces at least part of the candidate audio data.

4. An audio reproducing apparatus according to claim 2, further including a decision unit which receives an instruction input to determine one audio signal of which sound image is assigned to a predetermined position by an operation of the displacement instruction unit as an object to be selected.

5. An audio reproducing apparatus according to claim 1, wherein the input unit includes a direction pointing unit which receives an input for selecting any one of the plurality of directions, so that one audio signal of which sound image is assigned to a position in the selected direction is determined to be selected.

6. An audio reproducing apparatus according to claim 1, wherein the input unit includes a direction detector which identifies a specified direction by detecting a motion of the user by a sensor the user puts on, so that one audio signal of which sound image is assigned to a position in the specified direction is determined to be selected.

7. An audio reproducing apparatus according to claim 1, wherein, the reproducing unit reproduces a plurality of audio data belonging to a category identical to the selected audio data at a level in a hierarchical structure of a music classification as subsequent the new plurality of candidate audio data, and, after the user further selects one of the plurality of outputted sounds, the reproducing unit further reproduces a plurality of audio data selected from the candidate audio data and a plurality of audio data belonging to the category identical to the selected audio data at a lower level in the hierarchical structure as further subsequent new candidate audio data.

8. An audio reproducing apparatus according to claim 1, wherein the reproducing unit decodes the plurality of candidate audio data, respectively, and performs a processing to have the user perceive an aurally separation of a plurality of decoded audio signals, on at least any of the plurality of audio signals.

9. An audio reproducing apparatus according to claim 1, wherein the reproducing unit assigns the sound images of the audio signals respectively to positions on a circumference of a circle with the user in the center.

10. An audio reproducing apparatus according to claim 1, wherein the reproducing unit assigns the sound images of the audio signals to any of positions corresponding to objects placed in a room user exists.

11. An audio reproducing apparatus according to claim 1, further comprising:
a reproduction object deciding unit which analyzes the audio data that the user has selected and reproduced and stores history information based on such selected audio data,
wherein the plurality of outputted sounds are selected from each group of audio data, and the groups of audio data are formed at least based on the history information.

12. An audio reproducing apparatus according to claim 11, wherein the reproduction object deciding unit operates to analyze the history information and determine information relating to the user's favorite types of audio data, and the groups of audio data are formed at least based on the user's favorite types of audio data.

13. An audio reproducing apparatus according to claim 1, wherein the reproducing unit provides temporal variation to amplitudes of the respective audio signals so that peaks thereof occur at different times, and provides more time at which the peaks occur to the audio signal assigned to the specific spatial position.

14. An audio reproducing apparatus according to claim 1, wherein the reproducing unit assigns respective frequency bands to be reproduced to the respective audio signals, and provides wider frequency bands to the audio signal assigned to the specific spatial position.

15. An audio reproducing method, including:
outputting a plurality of audio signals simultaneously reproduced from a plurality of candidate audio data, after assigning sound images of the plurality of audio signals to different spatial positions around a user;
receiving an input by which the user selects one of a plurality of outputted sounds that the user hears simultaneously from different directions; and
reproducing only audio data corresponding to the selected one unit of sound,
wherein, the outputting includes processing for providing different aural perceivability levels, other than a sound image localization, to the audio signals of the plurality of candidate audio data depending on the assigned spatial position, so that the aural perceivability of an audio signal assigned to a specific spatial position is always high even when the audio signal assigned to the specific spatial position is changed.

16. An audio reproducing method according to claim 15, the receiving an input including:
receiving an instruction input to vary positions to which sound images of the plurality of sounds are assigned so that a sound image of a sound to be selected is assigned to a predetermined position; and
receiving an instruction input to determine the sound of which sound image is assigned to the predetermined position as an object to be selected.

17. An audio reproducing method according to claim 15, wherein the receiving an input includes receiving an input for specifying a direction, so that a sound of which sound image is assigned to a position in the specified direction is determined to be selected.

18. A non-transitory, computer-readable storage medium having a program stored thereon, the program including:
a module which reads out a plurality of candidate audio data from a memory and outputs the plurality of reproduced audio data simultaneously, after assigning sound images of the plurality of reproduced audio data to different spatial positions around a user, respectively;
a module which receives an input by which the user selects one of a plurality of outputted sounds that the user hears simultaneously from different directions; and
a module which reproduces only audio data corresponding to the selected one unit of sound;
wherein, the module which reads out the plurality of candidate audio data and outputs the plurality of reproduced audio data further performs processing for providing different aural perceivability levels, other than a sound image localization, to the audio signals of the plurality of candidate audio data depending on the assigned spatial position, so that the aural perceivability of an audio signal assigned to a specific spatial position is always high even when the audio signal assigned to the specific spatial position is changed.

* * * * *